United States Patent
Nakagawa et al.

(10) Patent No.: US 10,792,931 B2
(45) Date of Patent: Oct. 6, 2020

(54) OPTICAL DEFLECTION APPARATUS, HEAD-UP DISPLAY APPARATUS, OPTICAL WRITING UNIT, IMAGE FORMING APPARATUS, AND OBJECT RECOGNITION APPARATUS

(71) Applicants: Jun Nakagawa, Kanagawa (JP); Toshihiro Yamashiro, Kanagawa (JP)

(72) Inventors: Jun Nakagawa, Kanagawa (JP); Toshihiro Yamashiro, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 294 days.

(21) Appl. No.: 16/005,962

(22) Filed: Jun. 12, 2018

(65) Prior Publication Data

US 2018/0290460 A1    Oct. 11, 2018

Related U.S. Application Data

(63) Continuation of application No. PCT/JP2016/086917, filed on Dec. 12, 2016.

(30) Foreign Application Priority Data

Dec. 18, 2015  (JP) ................. 2015-247656

(51) Int. Cl.
  *B41J 2/47*      (2006.01)
  *G01S 7/481*     (2006.01)
  (Continued)

(52) U.S. Cl.
  CPC ............ *B41J 2/47* (2013.01); *G01S 7/481* (2013.01); *G02B 26/08* (2013.01);
  (Continued)

(58) Field of Classification Search
  None
  See application file for complete search history.

(56) References Cited

U.S. PATENT DOCUMENTS

7,031,040 B2    4/2006  Fujii et al.
8,463,082 B2    6/2013  Nakagawa et al.
(Continued)

FOREIGN PATENT DOCUMENTS

EP    2891917       9/2017
JP    2004-341320   12/2004
(Continued)

OTHER PUBLICATIONS

International Search Report dated Feb. 7, 2017 in PCT/JP2016/086917 filed on Dec. 12, 2016.
(Continued)

*Primary Examiner* — Jennifer D. Carruth
(74) *Attorney, Agent, or Firm* — IPUSA, PLLC

(57) ABSTRACT

An optical deflection apparatus includes a mirror unit, a pair of elastic supporting units configured to rotatably support the mirror unit around a predetermined axis, at least one drive unit configured to elastically deform the pair of elastic supporting units, and a drive control unit configured to input a drive frequency into the at least one drive unit so as to control the at least one drive unit, wherein a first time interval at which the drive control unit changes the drive frequency in a first temperature range is shorter than a second time interval at which the drive control unit changes the drive frequency in a second temperature range, the second temperature range being at a higher temperature than the first temperature range.

12 Claims, 14 Drawing Sheets

(51) Int. Cl.
    *G02B 26/10*     (2006.01)
    *G02B 27/01*     (2006.01)
    *H04N 5/74*     (2006.01)
    *G02B 26/08*     (2006.01)
    *H04N 1/113*     (2006.01)

(52) U.S. Cl.
    CPC ......... *G02B 26/0858* (2013.01); *G02B 26/10* (2013.01); *G02B 27/01* (2013.01); *H04N 1/113* (2013.01); *H04N 5/74* (2013.01)

(56) References Cited

U.S. PATENT DOCUMENTS

| | | |
|---|---|---|
| 9,448,402 B2 | 9/2016 | Akanuma et al. |
| 2008/0074718 A1 | 3/2008 | Bush et al. |
| 2011/0122101 A1* | 5/2011 | Kurozuka ........ G02B 27/0101 345/204 |
| 2016/0109697 A1 | 4/2016 | Nakagawa et al. |

FOREIGN PATENT DOCUMENTS

| | | |
|---|---|---|
| JP | 2011-002537 | 1/2011 |
| JP | 2011-017885 | 1/2011 |
| JP | 2012-053216 | 3/2012 |
| JP | 2012-118290 | 6/2012 |
| JP | 2013-173465 | 9/2013 |
| JP | 2015-040928 | 3/2015 |
| JP | 2015-090463 | 5/2015 |
| JP | 2015-129801 | 7/2015 |
| JP | 2015-132768 | 7/2015 |

OTHER PUBLICATIONS

Extended European Search Report for 16875590.8 dated Nov. 20, 2018.

\* cited by examiner

OPTICAL DEFLECTION APPARATUS, HEAD-UP DISPLAY APPARATUS, OPTICAL WRITING UNIT, IMAGE FORMING APPARATUS, AND OBJECT RECOGNITION APPARATUS

CROSS-REFERENCE TO RELATED APPLICATIONS

The present application is a continuation application of International Application No. PCT/JP2016/086917, filed on Dec. 12, 2016, which claims priority to Japanese Patent Application No. 2015-247656 filed on Dec. 18, 2015. The contents of these applications are incorporated herein by reference in their entirety.

BACKGROUND OF THE INVENTION

1. Field of the Invention

The disclosures herein generally relate to an optical deflection apparatus, a head-up display apparatus, an optical writing unit, an image forming apparatus, and an object recognition apparatus.

2. Description of the Related Art

Conventionally, an optical deflection apparatus that two-dimensionally scans a laser beam emitted from a light source is known (see Patent Document 1).

An optical deflection apparatus disclosed in Patent Document 1 includes a sub-scanning oscillation unit that oscillates around a sub-scanning oscillation axis, and a mirror unit that oscillates around respective oscillation axes. The sub-scanning oscillation unit is supported by a supporting unit through an arm so as to oscillate in the sub-scanning direction, and the mirror unit is supported by the sub-scanning oscillation unit through a plurality of beams so as to oscillate around a main-scanning oscillation axis. Piezoelectric elements are attached to the surfaces of the respective beams. As the piezoelectric elements extend and contract, the beams elastically deform, causing the mirror unit to oscillate around the main-scanning oscillation axis and also causing the sub-scanning oscillation unit to oscillate around the sub-scanning axis. Accordingly, a laser beam incident on the mirror unit is two-dimensionally scanned.

In such an optical deflection apparatus, resonance of the beams is utilized to oscillate the mirror unit around the oscillation axis. However, such an optical deflection apparatus has a problem in that resonance characteristics vary due to a change in ambient temperature, causing a deflection angle of the mirror unit to change significantly.

RELATED-ART DOCUMENTS

Patent Document 1

Japanese Unexamined Patent Application Publication no. 2013-173465

SUMMARY OF THE INVENTION

According to an aspect of at least one embodiment, an optical deflection apparatus includes a mirror unit, a pair of elastic supporting units configured to rotatably support the mirror unit around a predetermined axis, at least one drive unit configured to elastically deform the pair of elastic supporting units, and a drive control unit configured to input a drive frequency into the at least one drive unit so as to control the at least one drive unit, wherein a first time interval at which the drive control unit changes the drive frequency in a first temperature range is shorter than a second time interval at which the drive control unit changes the drive frequency in a second temperature range, the second temperature range being at a higher temperature than the first temperature range.

DESCRIPTION OF THE PREFERRED EMBODIMENTS

In the following, an optical deflection apparatus according to one embodiment of the present invention, a head-up display apparatus that includes the optical deflection apparatus, an optical writing unit that includes the optical deflection apparatus, an image forming apparatus that includes the optical writing unit, and an object recognition apparatus that includes the optical deflection apparatus will be described with reference to the accompanying drawings.

It is an object of at least one embodiment of the present invention to provide an optical deflection apparatus that can suppress a change in a deflection angle due to a change in ambient temperature, a head-up display apparatus that includes the optical deflection apparatus, an optical writing unit that includes the optical deflection apparatus, an image forming apparatus that includes the optical writing unit, and an object recognition apparatus that includes the optical deflection apparatus.

First Embodiment

Figure 1:
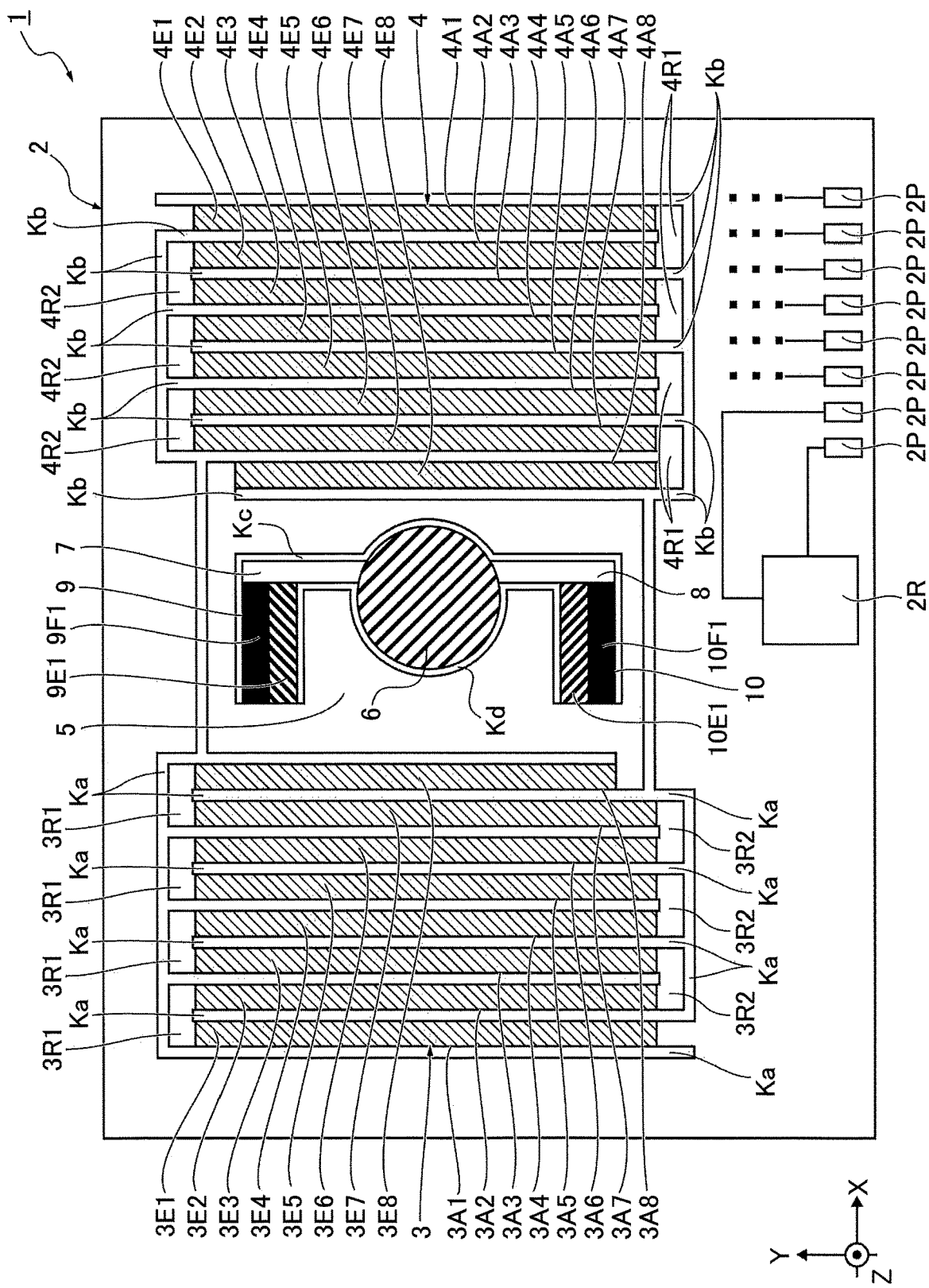
FIG. 1 is a plan view illustrating a configuration of an optical deflector according to a first embodiment of the present invention.

FIG. 1 illustrates an optical deflector 1 of the optical deflection apparatus. The optical deflector 1 is what is known as a microelectromechanical systems (MEMS) device. The optical deflector 1 includes a frame-shaped substrate 2, a pair of elastic units 3 and 4 formed in a serpentine shape by a plurality of slits Ka and Kb, a moving unit 5 (a base) supported by the elastic units 3 and 4, and a mirror unit 6 supported by the moving unit 5. Further, the substrate 2, the elastic units 3 and 4, the moving unit 5, and the mirror unit 6 are formed on a single SOI (silicon on insulator) substrate. In FIG. 1, a y-axis direction is a top-bottom direction and an x-axis direction is a right-left direction.

A temperature measuring resistor (a temperature detecting unit) 2R made of platinum and configured to detect an ambient temperature and a plurality of electrode terminals 2P made of platinum are formed on the lower surface (in FIG. 1) of the substrate 2. As the temperature measuring resistor 2R is made of platinum, a temperature can be accurately detected.

Elastic Unit 3

The elastic unit 3 includes a plurality of beams 3A1 to 3A8 arranged in parallel. A lower portion of the beam 3A1 is fixed to the substrate 2 and a lower portion of the beam 3A8 is fixed to a left lower portion (in FIG. 1) of the moving unit 5.

Further, upper portions of the beams 3A1, 3A3, 3A5, and 3A7 and upper portions of the beams 3A2, 3A4, 3A6, and 3A8 are respectively coupled to each other via couplers 3R1. Also, lower portions of the beams 3A2, 3A4, and 3A6 and lower portions of the beams 3A3, 3A5, and 3A7 are respectively coupled to each other via couplers 3R2.

Driving piezoelectric elements (drive parts) 3E1 to 3E8 that elastically deform the beams 3A1 to 3A8 are attached to the surfaces of the beams 3A1 to 3A8.

Elastic Unit 4

The elastic unit 4 includes a plurality of beams 4A1 to 4A8 arranged in parallel. An upper portion of the beam 4A1 is fixed to the substrate 2 and a lower portion of the beam 4A8 is fixed to a right lower portion (in FIG. 1) of the moving unit 5. Further, lower portions of the beams 4A1, 4A3, 4A5, 4A7 and lower portions of the beams 4A2, 4A4, 4A6, and 4A8 are respectively coupled to each other via couplers 4R1. Also, upper portions of the beams 4A2, 4A4, and 4A6 and upper portions of the beams 4A3, 4A5, and 4A7 are respectively coupled to each other via couplers 4R2.

Driving piezoelectric elements (drive units) 4E1 to 4E8 that elastically deform the beams 4A1 to 4A8 are attached to the surfaces of the beams 4A1 to 4A8.

The beams 3A1 to 3A8 and the beams 4A1 to 4A8 are divided into odd-numbered beams and even-numbered beams. Also, different drive voltages are applied to the odd-numbered driving piezoelectric elements 3E1, 3E3, 3E7, 4E1, 4E3, and 4E7 versus the even-numbered driving piezoelectric elements 3E2, 3E4, 3E8, 4E2, 4E4, and 4E8. Accordingly, the beams 3A1 to 3A8 and the beams 4A1 to 4A8 are deformed in such a manner that the beams 3A1 to 3A8 and 4A1 to 4A8 adjacent to each other are deformed in directions opposite to each other. As the amount of deflection is accumulated, the mirror unit 6 is caused to rotate at a large angle around the x-axis.

The rotation of the mirror unit 6 around the x-axis allows reflected light from the mirror unit 6 to be scanned in a vertical direction (a y-axis direction: a sub-scanning direction). In other words, by rotating the mirror unit 6 around the x-axis, the optical deflector 1 can deflect light (light flux) emitted from a light source in the y-axis direction.

Mirror Unit

The upper portion and lower portion (in FIG. 1) of the mirror unit 6 are supported at eccentric positions by a pair of torsion bars 7 and 8. In FIG. 1, the pair of the torsion bars 7 and 8 support the mirror unit 6 at positions displaced from the center of the mirror unit 6 toward the positive side of the x-axis direction. Further, the mirror unit has a reflective film (for example, a metal film made of Ag or Al on one side (the positive side of the z-axis direction) and a rib (a projection) for suppressing deformation of the mirror unit 6 on the other side (the negative side of the z-axis direction).

An upper portion of the torsion bar 7 is fixed to the moving unit 5 via an elastic unit 9 formed in a rectangle shape having long sides in the right-left direction (in FIG. 1). Namely, only the upper left portion of the torsion bar 7 is supported (cantilevered) by the elastic unit 9. A driving piezoelectric element (a drive unit) 9E1 that elastically deforms the elastic unit 9 and a detecting piezoelectric element (a detecting unit) 9F1 that detects an amount of elastic deformation of the elastic unit 9 are attached to the surface of the elastic unit 9.

A lower portion of the torsion bar 8 is fixed to the moving unit 5 via an elastic unit 10 formed in a rectangle shape having long sides in the right-left direction (in FIG. 1). Namely, only the lower left portion of the torsion bar 8 is supported (cantilevered) by the elastic unit 10. A driving piezoelectric element (a drive unit) 10E1 that elastically deforms the elastic unit 10 and a detecting piezoelectric element (a detecting unit) 10F1 that detects an amount of elastic deformation of the elastic unit 10 are attached to the surface of the elastic unit 10. Further, Kc and Kd are slits.

The torsion bars 7 and 8 and the elastic units 9 and 10 form a pair of elastic supporting units that rotatably support the mirror unit 6 on the moving unit 5.

The mirror unit 6 oscillates around the y-axis (around a main-scanning oscillation axis) by utilizing resonance of the torsion bars 7 and 8 and the elastic units 9 and 10 so as to scan (deflect) a reflected laser beam (luminous flux) incident on the mirror unit 6 in the x-direction (main-scanning direction). In other words, the pair of elastic supporting units formed by the torsion bars 7 and 8 and the elastic units 9 and 10 causes the mirror unit 6 to resonate, thereby causing the mirror unit 6 to rotate around the y-axis. As a result, a laser beam (luminous flux) incident on the mirror unit 6 can be deflected in the y-axis direction.

Figure 4:
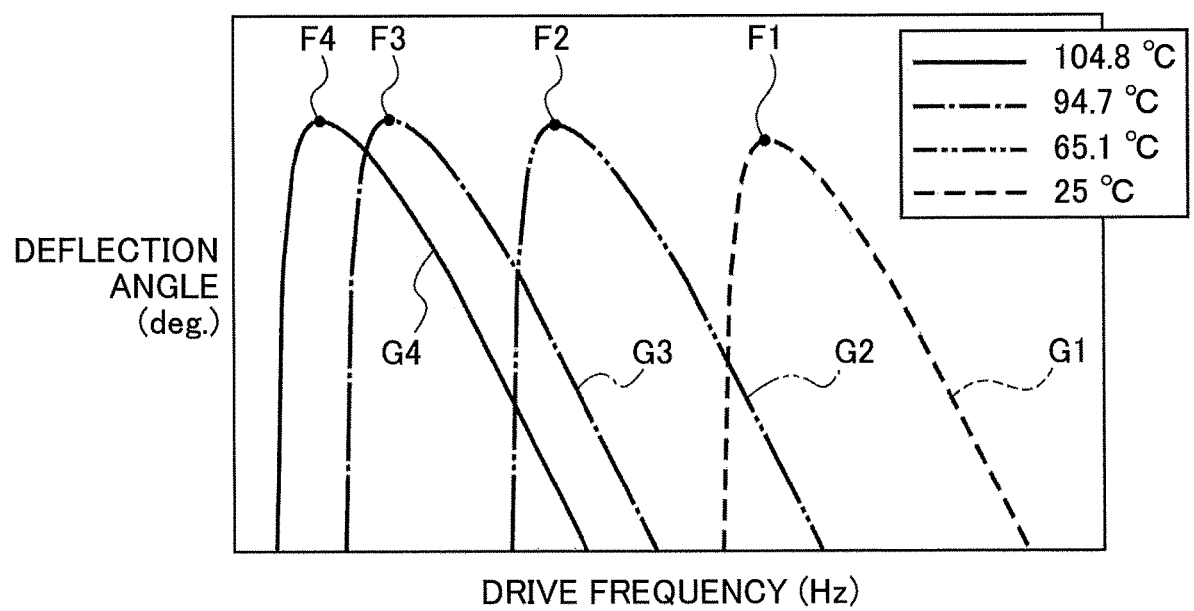
FIG. 4 is a graph illustrating resonance frequency characteristics indicated by each ambient temperature of a mirror unit illustrated in FIG. 1.

The mirror unit 6 is supported at eccentric positions by the torsion bars 7 and 8, and the torsion bars 7 and 8 are cantilevered by the elastic units 9 and 10. Therefore, as illustrated in FIG. 4, in resonance frequency characteristics of the mirror unit 6, a slope on a higher frequency side (one side) relative to a resonance point (a resonance frequency) is gentler (smaller) than a slope on a lower frequency side (the other side) relative to the resonance point. Further, as will be described later, an optical scanning drive control unit 16 inputs, as a drive frequency, a frequency on the small slope side to the driving piezoelectric elements 9E1 and 10E1. At this time, the center of rotation (a point at which deformation of the reflective surface of the mirror unit 6 on the positive side of the z-direction becomes zero at the time of rotation) differs from the center of the shape of the mirror (for example, if the mirror has a circle shape, the center of the circle). As a result, the shape of resonance frequency characteristics becomes asymmetric.

A deflection angle of the mirror unit 6 in the main-scanning direction is calculated by the optical scanning drive control unit 16, which will be described later, based on an amount of elastic deformation of the elastic unit 9 detected by the detecting piezoelectric element 9F1 and an amount of elastic deformation of the elastic unit 10 detected by the detecting piezoelectric element 10F1.

Figure 2:
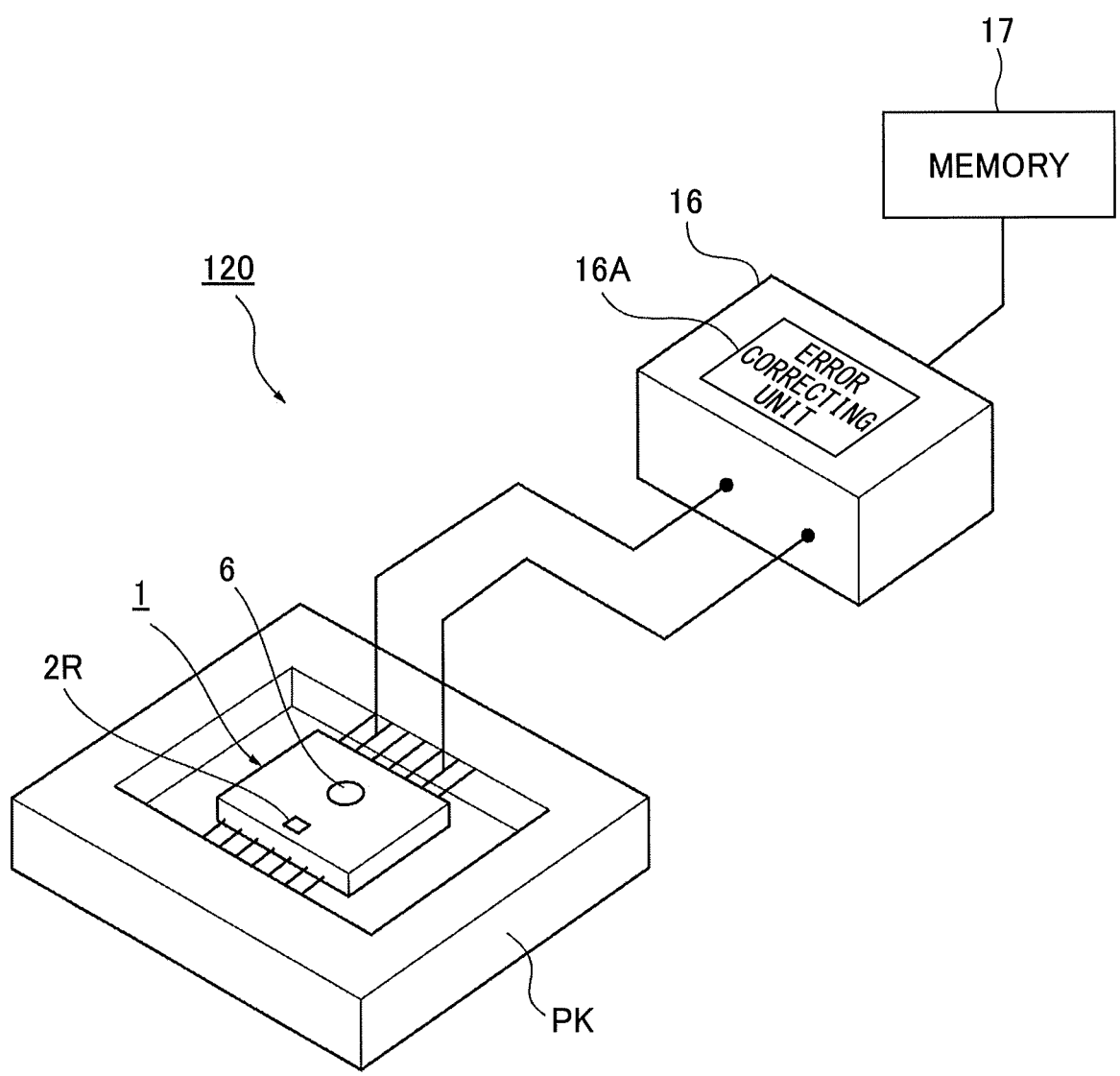
FIG. 2 is a block diagram illustrating a configuration of an optical deflection apparatus including an optical deflector according to the first embodiment.

As illustrated in FIG. 2, the optical deflector 1 is placed and packaged in a ceramic package PK. By packaging the optical deflector 1, the optical deflector 1 can be easily handled, and further, a temperature detected by the temperature measuring resistor 2R can conform to a temperature of the mirror unit 6, making it possible to provide the highly-reliable optical deflector 1.

Optical Deflection Apparatus

In FIG. 2, reference numeral 120 denotes an optical deflection apparatus. The optical deflection apparatus 120 includes the optical deflector 1, the optical scanning drive control unit (drive control unit) 16, and a memory 17.

The optical scanning drive control unit 16 controls the driving of the driving piezoelectric elements 3E1 to 3E8 of the beams 3A1 to 3A8 and 4E1 to 4E8 of the beams 4A1 to 4A8 of the optical deflector 1, and also controls the driving of the driving piezoelectric elements 9E1 and 10E1 of the elastic units 9 and 10. This control causes the mirror unit 6 of the optical deflector 1 to oscillate in the x-axis direction (see FIG. 1) and in the y-axis direction.

Further, the optical scanning drive control unit 16 controls the driving of the driving piezoelectric element 9E1 and 10E1 by using a drive signal whose frequency is 20 Hz higher than a resonance point in resonance frequency characteristics of the mirror unit 6 (hereinafter referred to as "resonance characteristics of the mirror unit 6" for convenience of explanation, although resonance frequency characteristics are determined by the mirror unit 6, the torsion bars 7 and 8, and the like). Also, the optical scanning drive control unit 16 includes an error correcting unit 16A configured to correct deflection angle error. The error correcting unit 16A is configured to correct deflection angle error of the mirror unit 6 based on a frequency characteristic gradient coefficient on a gentle slope side of a resonance characteristic curve and also based on an actual deflection angle and a desired deflection angle of the mirror unit 6.

As illustrated in FIG. 4, resonance frequency characteristics of the mirror unit significantly differ according to the ambient temperature. Graphs G1 through G4 illustrate resonance characteristic curves each indicating resonance frequency characteristics at ambient temperatures of 25° C., 65.1° C., 94.7° C., and 104.8° C. In each of the graphs G1 through G4, the horizontal axis denotes a drive frequency (Hz) and the vertical axis denotes a deflection angle (degrees). Gentle slopes of the graphs G1 through G4 are approximately the same and can be regarded as identical. Namely, frequency characteristic gradient coefficients of the graphs G1 through G4 can be regarded as identical. Further, in the graphs G1 through G4, reference numerals F1 through F4 each denote a frequency at a resonance point in the resonance characteristics. In each of the graphs G1 through G4 illustrated in FIG. 4, a slope on the higher frequency side relative to the resonance point is smaller than (gentle compared to) a slope on the low frequency side. In the first embodiment, the slope on the high frequency side in each of the graphs G1 through G4 (a degree of change in a deflection angle according to the drive frequency) refers to a frequency characteristic gradient coefficient.

Figure 5:
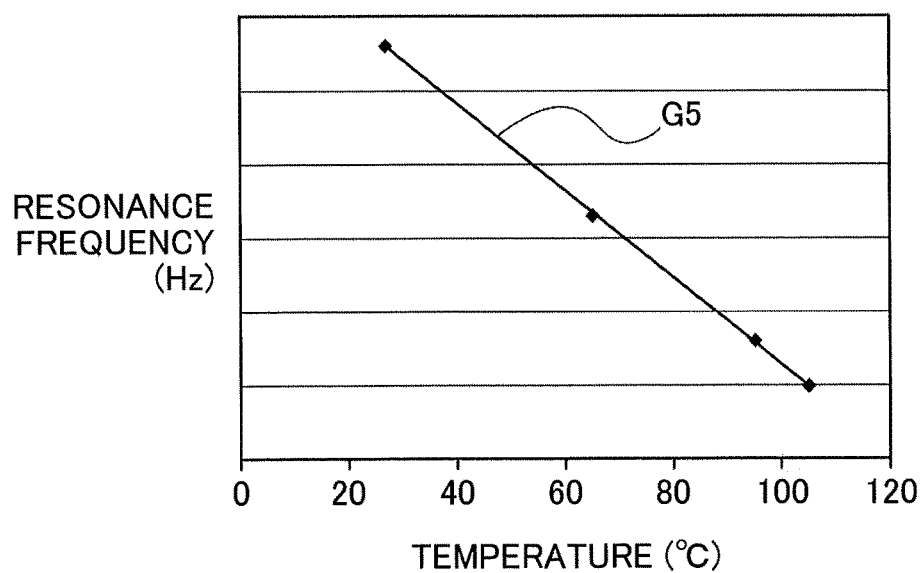
FIG. 5 is a graph illustrating a relationship between an ambient temperature and a resonance frequency of the mirror unit illustrated in FIG. 1.
Figure 6:
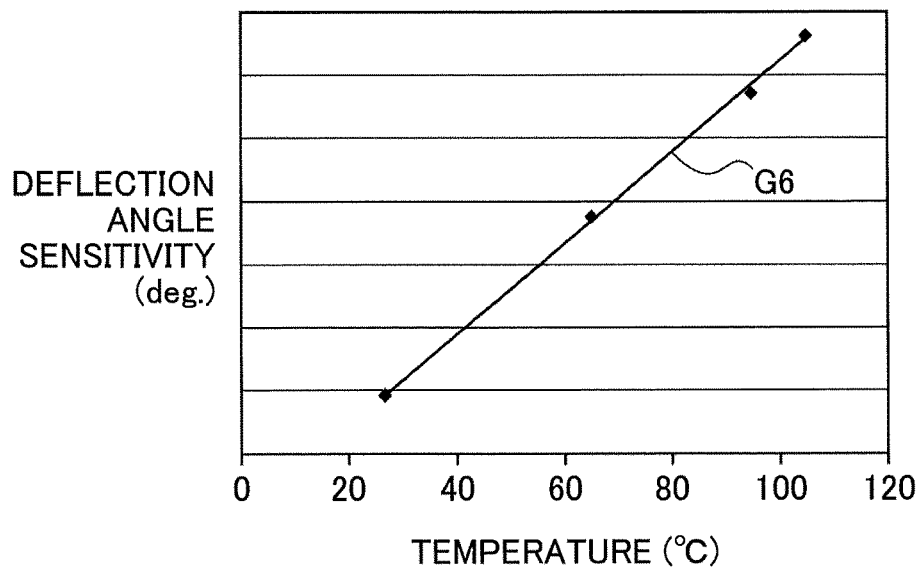
FIG. 6 is a graph illustrating a relationship between an ambient temperature and a deflection angle of the mirror unit.

The memory 17 stores frequency characteristic gradient coefficients, a resonance frequency F1 at the ambient temperature of 25° C., a graph G5 indicating a relationship between a temperature (an ambient temperature) and a resonance frequency as illustrated in FIG. 5, and a slope of the graph G5. Namely, the memory 17 stores resonance frequency temperature characteristic coefficients and the graph G5. Further, as illustrated in FIG. 6, the memory 17 stores a graph G6 indicating a relationship between a temperature (an ambient temperature) and a deflection angle of the mirror unit 6, and a slope of the graph G6. Namely, the memory 17 stores deflection angle sensitivity temperature characteristic coefficients and the graph G6. Further, in FIG. 6, the vertical axis denotes a deflection angle of the mirror unit 6 when the piezoelectric elements 9E1 and 10E1 are driven at a drive voltage of 1V.

Moreover, the graph G5 indicating the resonance frequency temperature characteristic coefficients and the graph G6 indicating the deflection angle sensitivity temperature characteristic coefficients are calculated based on the graphs G1 through G4 and the like.

Operation of Optical Deflection Apparatus

Figure 3:
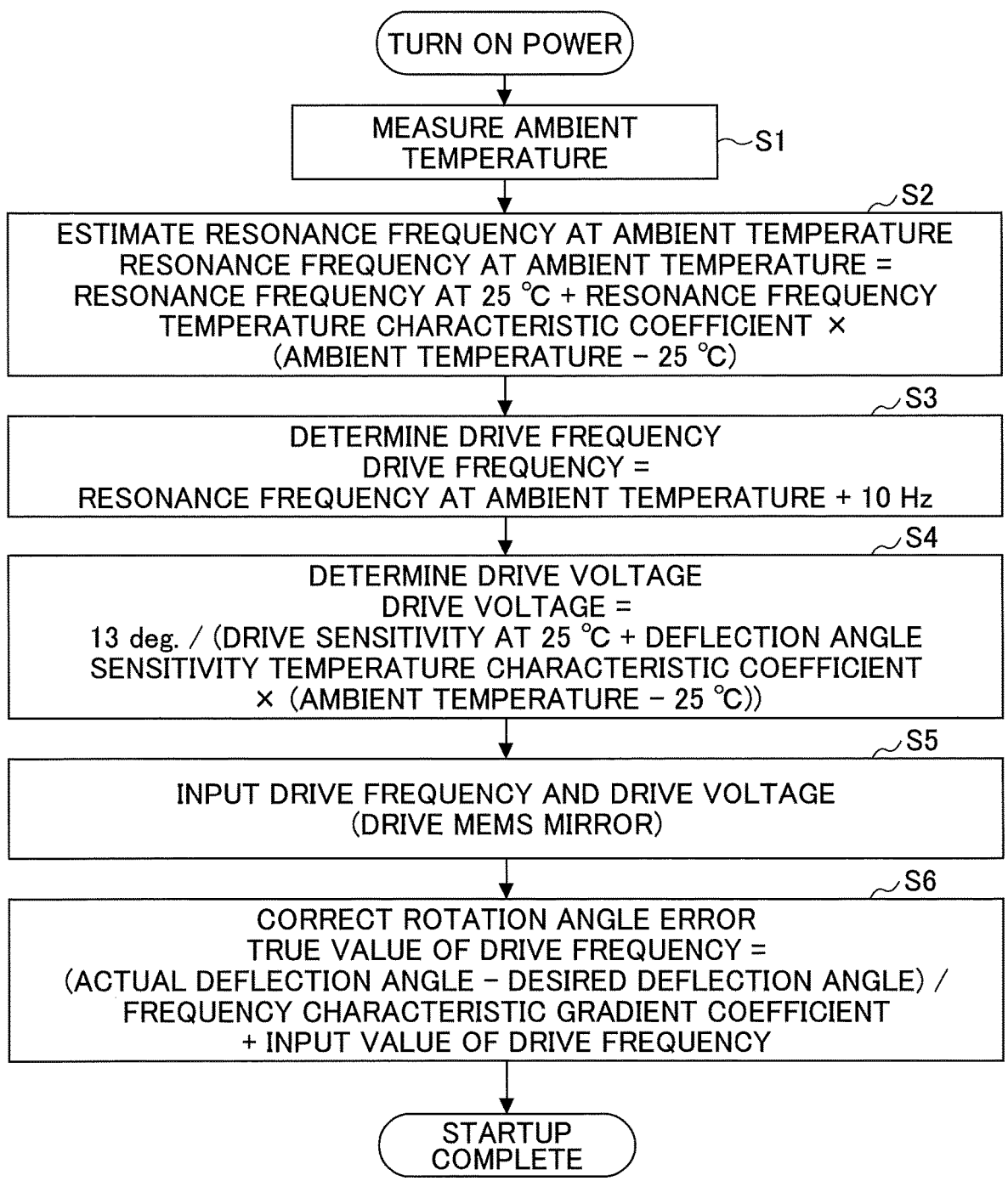
FIG. 3 is a flowchart illustrating an operation of the optical deflection apparatus illustrated in FIG. 2.

Next, referring to a flowchart illustrated in FIG. 3, an operation of the optical deflection apparatus 120 will be described.

In step S1, the temperature measuring resistor 2R detects an ambient temperature of the optical deflector 1. For example, the temperature measuring resistor 2R detects a surrounding temperature of the optical deflector 1.

In step S2, a resonance frequency Fa at the ambient temperature detected by the temperature measuring resistor 2R is estimated. This resonance frequency Fa (resonance frequency at the ambient temperature) is calculated by the following formula.

In the following formula, F1 denotes a resonance frequency of the mirror unit 6 at 25° C. Fa=F1 resonance frequency temperature characteristic coefficient×(ambient temperature 25° C.)

For example, when the ambient temperature is 30° C., the resonance frequency Fa is calculated by: Fa=F1+resonance frequency temperature characteristic coefficient×5.

In step S3, a drive frequency Fd for the driving piezoelectric elements 9E1 and 10E1 of the optical deflector 1 is determined (set). The drive frequency Fd is calculated by Fd=Fa+10 Hz. Namely, a frequency 10 Hz higher than the resonance frequency at the ambient temperature is determined (set) as the drive frequency Fd.

In step S4, a drive voltage Vd for the driving piezoelectric elements 9E1 and 10E1 of the optical deflector 1 is determined. The drive voltage Vd is calculated by the following formula. Vd=13 degrees/(H1+deflection angle sensitivity temperature characteristic coefficient×(ambient temperature−25° C.)

H1 denotes drive sensitivity at 25° C. The drive sensitivity at 25° C. indicates a deflection angle of the mirror unit 6 when the driving piezoelectric elements 9E1 and 10E1 are driven at a drive voltage of 1V under the ambient temperature of 25° C. The drive sensitivity at 25° C. is stored in the memory 17.

In step S5, the driving piezoelectric elements 9E1 and 10E1 are driven at the drive voltage Vd calculated in step S4 with the drive frequency calculated in step S3 so as to rotate the mirror unit 6 around the y-axis.

Figure 7:
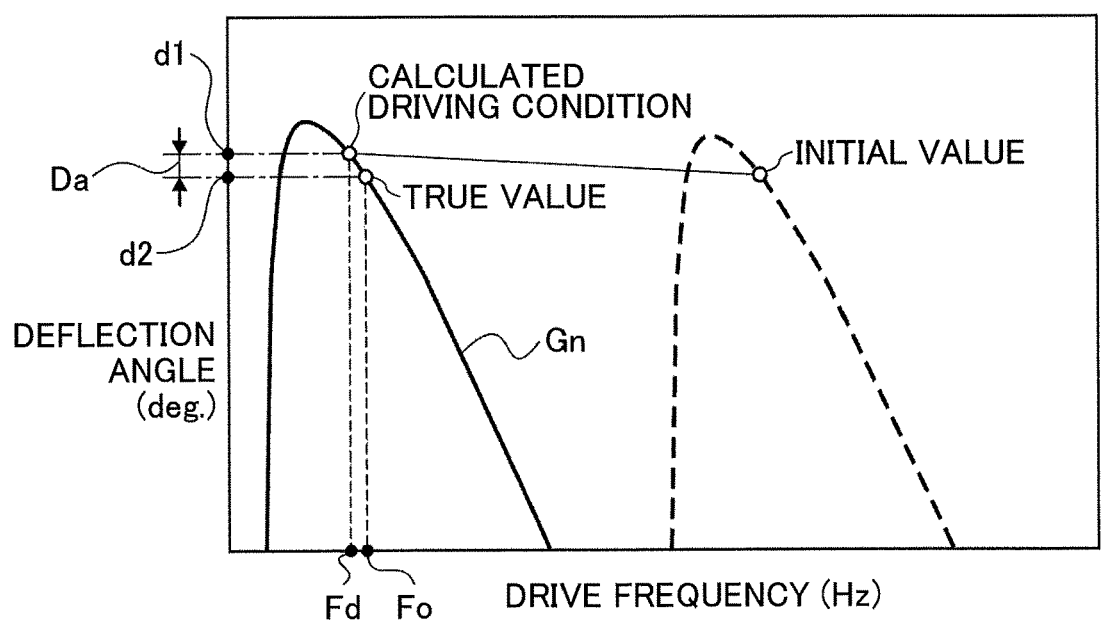
FIG. 7 is a graph for explaining error correction performed by an error correcting unit illustrated in FIG. 2.

In step S6, the error correcting unit 16A corrects rotation angle error (deflection angle error) of the mirror unit 6 rotated around the y-axis in step S5. As illustrated in FIG. 7, deflection angle error Da denotes a difference between a deflection angle d1 when the mirror unit 6 is actually driven and a desired deflection angle d2. Based on the deflection angle error Da, a true value Fo of the drive frequency is calculated in such a manner that the actual deflection angle d1 becomes the same as the desired deflection angle d2. Namely, the error correcting unit 16A of the optical scanning drive control unit 16 corrects error by calculating a true value Fo of the drive frequency based on the frequency characteristic gradient coefficient α and the like by using the formula below such that the deflection angle error Da becomes zero.

For example, the optical scanning drive control unit 16 may determine a true value Fo of the drive frequency as follows. By referring to the memory 17 that stores rotation angles of the mirror unit 6 corresponding to respective drive frequencies, the optical scanning drive control unit 16 may determine a true value Fo of the drive frequency based on a rotation angle (deflection angle) at the time when the drive frequency Fd determined in step S3 is input into the driving piezoelectric elements 9E1 and 10E1. The memory 17 preliminarily stores relationships between deflection angles and corresponding drive frequencies as indicated by the graphs G1 through G4 of FIG. 4. Further, the detecting piezoelectric elements 9F1 and 10F1, functioning as angle detecting units, detect a rotation angle (deflection angle) of the mirror unit 6 at the time when the drive frequency Fd is input into the driving piezoelectric elements 9E1 and 10E1. Note that rotation angles of the mirror unit 6 corresponding to respective drive frequencies are measured and stored in the memory 17 before the detecting piezoelectric elements 9F1 and 10F1 detect a rotation angle of the mirror unit 6. Fo=(Da/frequency characteristic gradient coefficient α)+input value of drive frequency The term "input value of drive frequency" refers to the frequency Fd calculated in step S3.

By using the true value Fo of the drive frequency, the driving piezoelectric elements 9E1 and 10E1 are driven so as to activate the optical deflector 1 and rotate the mirror unit 6 around the y-axis in a bidirectional manner by utilizing resonance of the mirror unit 6.

As described, the drive frequency is set to a frequency 10 Hz higher than the resonance frequency. Namely, the drive frequency is set to a frequency side whose resonance characteristic curve has a gentle slope. At the drive frequency set in this way, the driving piezoelectric elements 9E1 and 10E1 are driven. Accordingly, even if resonance characteristics change due to a change in ambient temperature and error occurs in the estimation of a resonance frequency at startup of the optical deflector 1, a change in a deflection angle of the mirror unit 6 can be suppressed. It is thus possible to prevent deflection of the mirror unit 6 that may cause damage at startup of the optical deflector 1.

Further, even if error occurs in a drive frequency due to manufacturing variations, a change in a deflection angle of the mirror unit 6 can be suppressed. Thus, the deflection of the mirror unit 6 that may cause damage at startup of the optical deflector 1 can also prevented.

In the first embodiment, the deflection angle error is corrected in step S6. Therefore, even if error occurs in the drive frequency due to manufacturing variations, in addition to a change in resonance characteristics due to a change in ambient temperature, a change in the deflection angle of the mirror unit 6 can be suppressed. Accordingly, deflection of the mirror unit 6 that may cause damage at startup of the optical deflector 1 can be prevented.

In the first embodiment, although the deflection angle error is corrected in step S6, step S6 is not necessarily required. If the deflection angle error is small, step S6 may be omitted.

In the first embodiment, the drive frequency of the mirror unit 6 is set to a frequency 10 Hz higher than the resonance frequency. However, a frequency for driving the mirror unit 6 is not limited thereto. For example, even when a frequency a few Hz to 20 Hz higher than the resonance frequency is used to drive the driving piezoelectric elements 9E1 and 10E1, a similar effect can be obtained. Namely, the drive frequency is preferably set in a range greater than the resonance frequency and less than or equal to the resonance frequency +20 Hz.

In the first embodiment, the elastic units 3, 4, 9, and 10 are deformed by the piezoelectric elements. However, the present invention is not limited thereto. For example, the elastic units 3, 4, 9, and 10 may be deformed by using electrostatic force or electromagnetic force.

Second Embodiment

Figure 8:
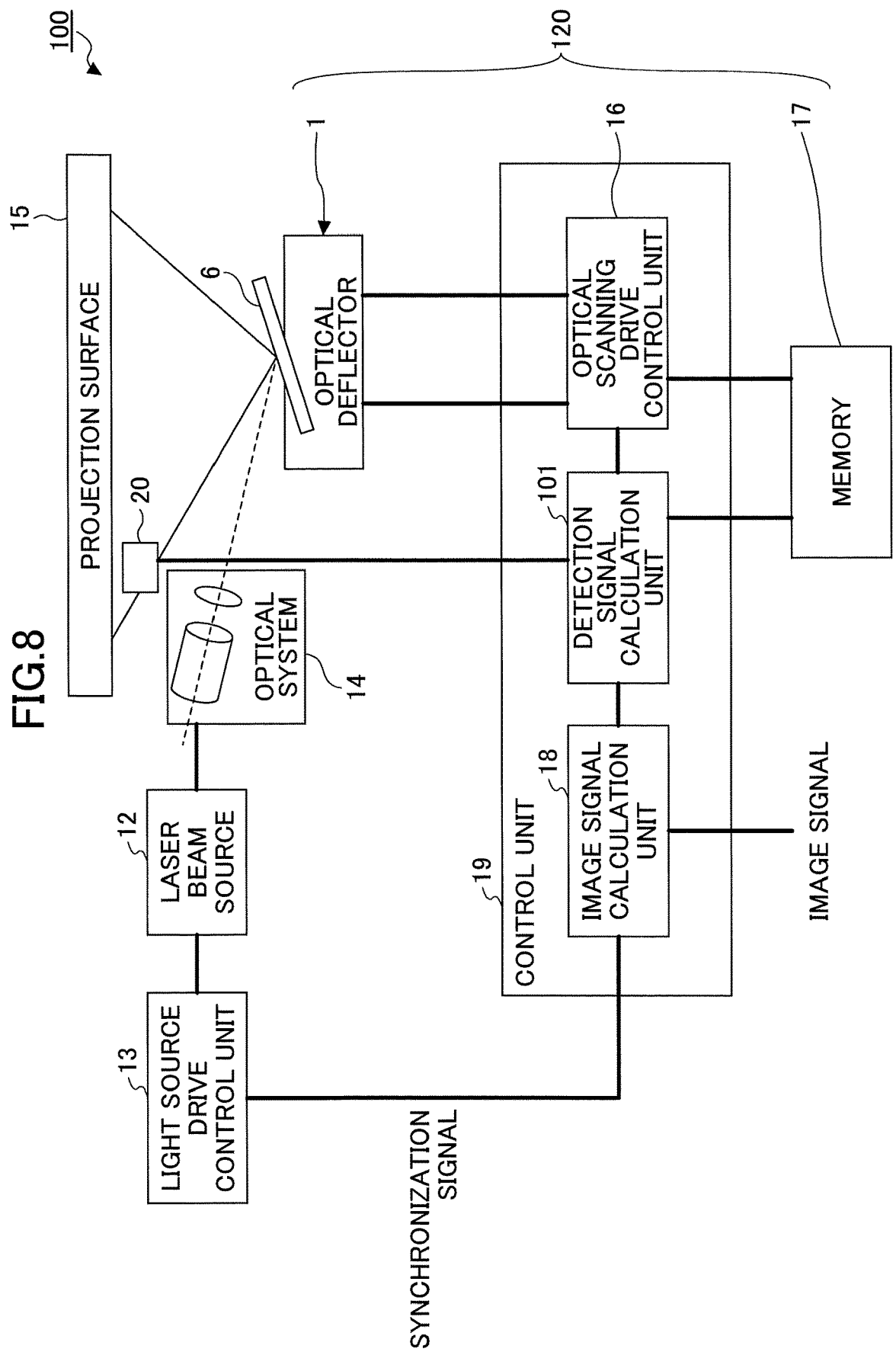
FIG. 8 is a block diagram illustrating a configuration of a head-up display apparatus according to a second embodiment.

Next, a head-up display apparatus 100 according to a second embodiment will be described. FIG. 8 is a block diagram illustrating a configuration of the head-up display apparatus 100 including the optical deflection apparatus 120 of the first embodiment.

The head-up display apparatus 100 includes the optical deflector 1, a laser beam source 12 that emits a laser beam, a light source drive control unit 13 that controls the laser beam source 12, an optical system 14, the memory 17, and an optical detecting unit 20.

The light source drive control unit 13 controls, for example, the on-off of the laser beam source 12 based on an image signal or a synchronization signal sent from the control unit 19.

The control unit 19 includes an image signal calculation unit 18, a detection signal calculation unit 101, and an optical scanning drive control unit 16.

The image signal calculation unit 18 separates an image signal into a horizontal synchronization signal and a vertical synchronization signal.

The detection signal calculation unit 101 calculates a timing at which the optical detecting unit 20 receives a laser beam scanned (reflected) by the mirror unit 6.

The optical scanning drive control unit 16 controls the oscillation (rotation) of the mirror unit 6 of the optical deflector 1 around the y-axis such that the horizontal synchronization signal sent from image signal calculation unit 18 conforms to the timing calculated by the detection signal calculation unit 101, at which the optical detecting unit 20 receives the laser beam. Further, the optical scanning drive control unit 16 controls the oscillation (rotation) of the mirror unit 6 of the optical deflector 1 around the x-axis based on the vertical synchronization signal.

Further, the optical deflector 1, the optical scanning drive control unit 16 of the control unit 19, and the memory 17 together form an optical deflection apparatus 120 similar to that of the first embodiment. The optical deflection apparatus 120 according to the present embodiment is operated in a similar way to the first embodiment, and thus a description thereof is omitted.

The head-up display apparatus 100 scans a reflected laser beam emitted from the optical system by oscillating the mirror unit 6 of the optical deflector 1 around the y-axis and around the x-axis.

Subsequently, the head-up display apparatus 100 causes an image of the image signal input into the image signal calculation unit 18 to be projected onto a projection surface 15.

Because the head-up display apparatus 100 according to the second embodiment includes the optical deflection apparatus 120, a similar effect to the first embodiment can be obtained.

Third Embodiment

Figure 9:
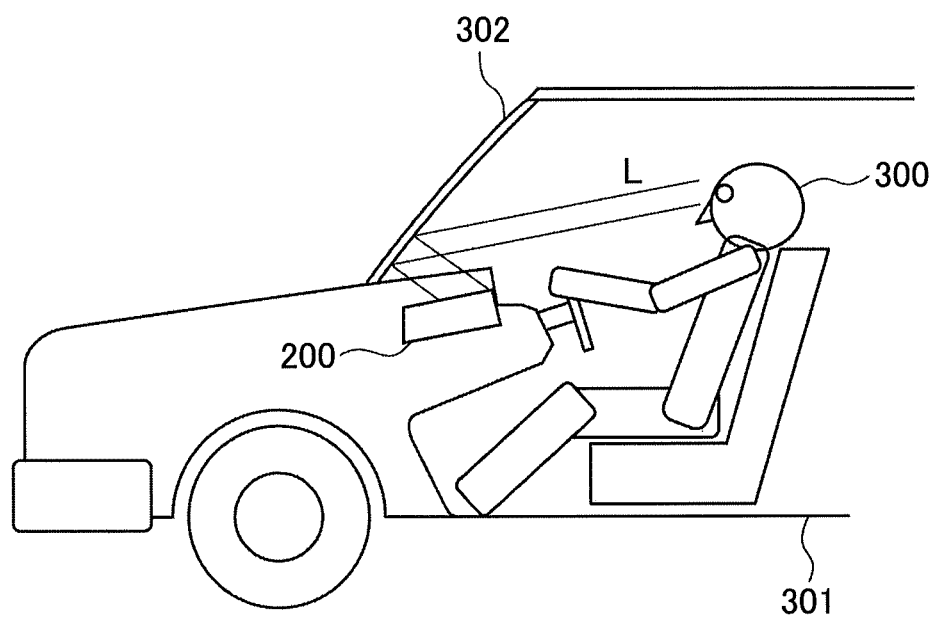
FIG. 9 is a schematic view schematically illustrating a configuration of a vehicle equipped with a head-up display apparatus including the optical deflection apparatus of the first embodiment.
Figure 10:
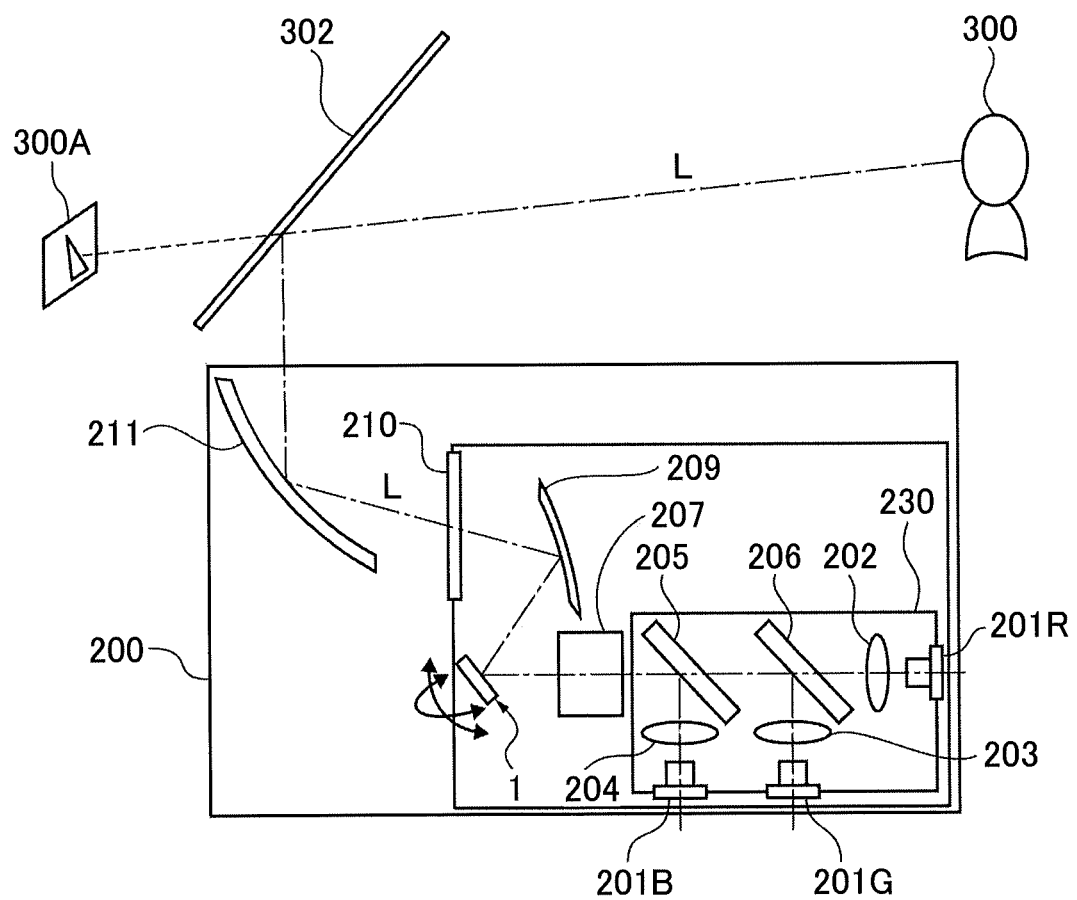
FIG. 10 is an optical arrangement diagram illustrating a configuration of the head-up display apparatus illustrated in FIG. 9.

Next, a head-up display apparatus 200 according to the third embodiment will be described. FIG. 9 is a schematic view schematically illustrating a configuration of a vehicle equipped with the head-up display apparatus 200 including the optical deflection apparatus of the first embodiment. Further, FIG. 10 is a schematic view schematically illustrating an internal configuration of the head-up display apparatus 200.

The head-up display apparatus 200 is disposed, for example, in a dashboard of a vehicle 301. Projection light L, which is light for projecting an image and that is emitted from the head-up display apparatus 200, is reflected from a windshield 302 toward an observer (a driver 300). The driver is also referred to as a user. Accordingly, the driver 300 can visually recognize the image projected by the head-up display apparatus 200 as a virtual image 300A. Further, a combiner may be disposed on the inner wall of the windshield 302 such that the user may visually recognize a virtual image formed by the projection light L reflected from the combiner.

The head-up display apparatus 200 includes red, green, and blue laser beam sources 201R, 201G, and 201B, collimator lenses 202, 203, and 204 provided for the respective laser beam sources, two dichroic mirrors 205 and 206, a light quantity adjuster 207, the optical deflector 1, a free-form mirror 209, a screen 210, and a projector mirror 211. A light source unit 230 functioning as a light source apparatus in the third embodiment includes the laser beam sources 201R, 201G, and 201B, the collimator lenses 202, 203, and 204, and the dichroic mirrors 205 and 206. These components are formed as a unit by an optical housing.

The head-up display apparatus 200 according to the third embodiment projects an intermediate image displayed on the screen 210 (corresponding to the projection surface 15 illustrated in FIG. 8) onto the windshield (front windscreen) 302 of the vehicle 301, such that the driver 300 can visually recognize the intermediate image as a virtual image. The laser beams emitted from the laser beam sources 201R, 201G, and 201B are approximately collimated by the collimator lenses 202, 203, and 204, respectively, and are synthesized by the two dichroic mirrors 205 and 206. The quantity of the synthesized laser beam is adjusted by the light quantity adjuster 207, and subsequently, the adjusted laser beam is two-dimensionally scanned by the optical deflector 201. The projection light L two-dimensionally scanned by the optical deflector 1 is reflected from the free-form mirror 209, and condensed onto the screen 210 after a distortion is corrected. Accordingly, an intermediate image is displayed. The screen 210 includes a microlens array where a plurality of microlenses are two-dimensionally arranged, which magnifies the projection light L entering the screen 210 on a per-microlens basis.

The optical deflector 1 is driven and controlled in a similar manner to the first embodiment, and causes the mirror unit 6 to rotate in a bidirectional manner in the main scanning direction and in the sub-scanning direction so as to two-dimensionally scan (raster-scan) the projection light L incident on the mirror unit 6. The optical deflector is driven and controlled in synchronization with a timing at which the laser beam sources 201R, 201G, and 201B emit laser beams.

The light source unit 230 according to the third embodiment is equivalent to a unit of the laser beam source 12 (see FIG. 8) and the optical system 14 according to the second embodiment. Moreover, the head-up display apparatus 200 according to the third embodiment is similar to the head-up display apparatus 100 according to the second embodiment but with the provision of the light quantity adjuster 207, the free-form mirror 209, and the projector mirror 211 are further provided.

The head-up display apparatus may be used as an image projecting apparatus that is installed not only in a vehicle, but also in a moving object such as an aircraft, a ship, and a mobile robot or in an non-moving object such as a working robot that manipulates an object such as a manipulator without moving out of the site.

In the above-described third embodiment, the head-up display functioning as an image projecting apparatus has been described. However, the present invention is not limited to the above-described embodiment, and any head-up display may be adopted as long as the head-up display uses the optical deflector of the first embodiment to project an image by performing optical scanning. For example, the head up display may be similarly applied to a projector that projects an image on a screen, and a head-mounted display that projects an image on a screen such as a light transmission member provided to a device mounted on the head of the observer, for example.

According to the third embodiment, because the optical deflector 1 is driven and controlled in a similar way to the first embodiment, a similar effect to the first embodiment can be obtained.

Fourth Embodiment

Figure 11:
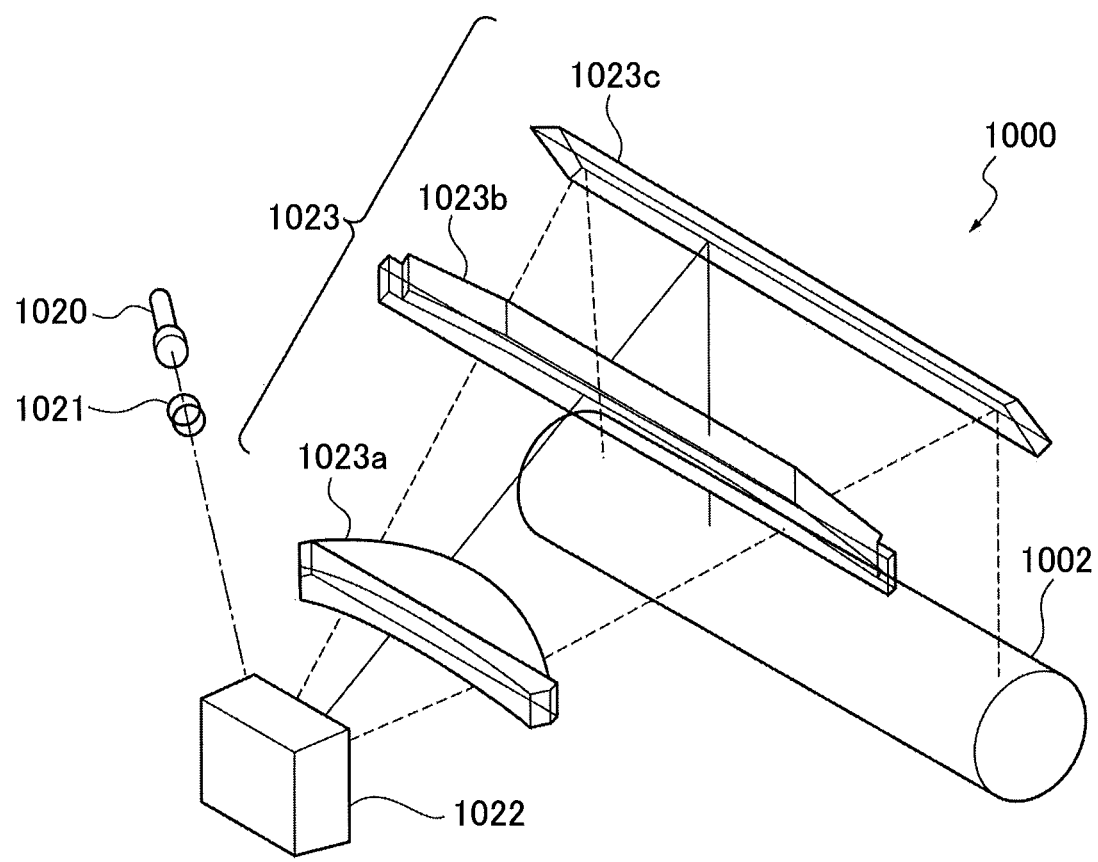
FIG. 11 is an optical arrangement diagram illustrating a configuration of an optical writing unit according to a fourth embodiment.

Next, an optical writing unit 1000 according to a fourth embodiment will be described. FIG. 11 illustrates the optical writing unit according to the fourth embodiment. In the optical writing unit 1000, a laser beam, such as a laser element, emitted from a light source unit 1020 passes through an imaging optical system 1021 such as a collimator lens, and is deflected by an optical deflector 1022. As the optical deflector 1022, the optical deflector 1 according to the first embodiment (see FIG. 1) is used, and the optical deflection apparatus 120 according to the first embodiment (see FIG. 2) is also used. In this case, only the driving piezoelectric elements 9E1 and 10E1 for the elastic units 9 and 10 of the optical deflector 1 (1022) are driven and controlled by the optical scanning drive control unit 16 such that a reflected laser beam is scanned only in the main scanning direction.

Further, the laser beam deflected by the optical deflector 1022 passes through a scanning optical system 1023 including a first lens 1023a, a second lens 1023b, and a reflecting mirror unit 1023c, and is irradiated to a surface (a scan surface) of a photoconductor drum 1002. The scanning optical system 1023 forms an image through spot shapes on the scan surface.

An electrode of each piezoelectric member of the optical deflector 1022 is electrically connected to a mirror drive unit such as an external power supply. The mirror drive unit applies a drive voltage between a lower electrode and an upper electrode of each of the piezoelectric members to drive the optical deflector 1022. Accordingly, the mirror unit of the optical deflector 1022 rotates in a bidirectional manner, causing the laser beam to be deflected and to be optically scanned onto the surface (the scan surface) of the photoconductor drum 1002.

As described above, the optical writing unit 1000 according to the fourth embodiment can be used as an optical writing unit for an image forming apparatus such as a photo-printing printer or a copier using a photoconductor. Further, by modifying the scanning optical system so as to enable not only uniaxial optical scanning, but also biaxial optical scanning, the optical writing unit 1000 may be used as a component of an optical scanning unit of a laser labelling apparatus in which a thermal medium is irradiated with a deflected laser beam and printing is performed by heating.

Figure 12:
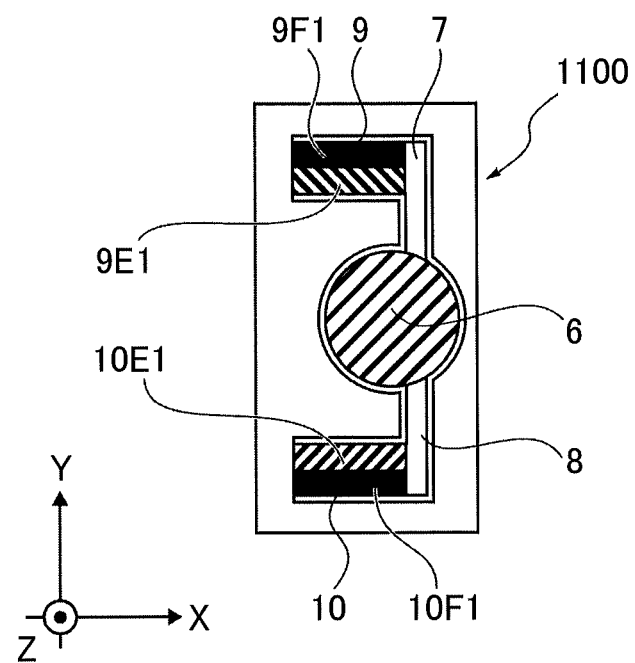
FIG. 12 is a diagram for explaining another exemplary configuration of the optical deflector.

In the fourth embodiment, the optical deflector 1 illustrated in FIG. 1 is used. However, as illustrated in FIG. 12, a dedicated optical deflector 1100 configured to scan a reflected laser beam only in the main-scanning direction may also be used.

According to the fourth embodiment, because the optical deflector 1022 is driven and controlled in a similar way to the first embodiment, a similar effect to the first embodiment can be obtained.

Fifth Embodiment

Figure 13:
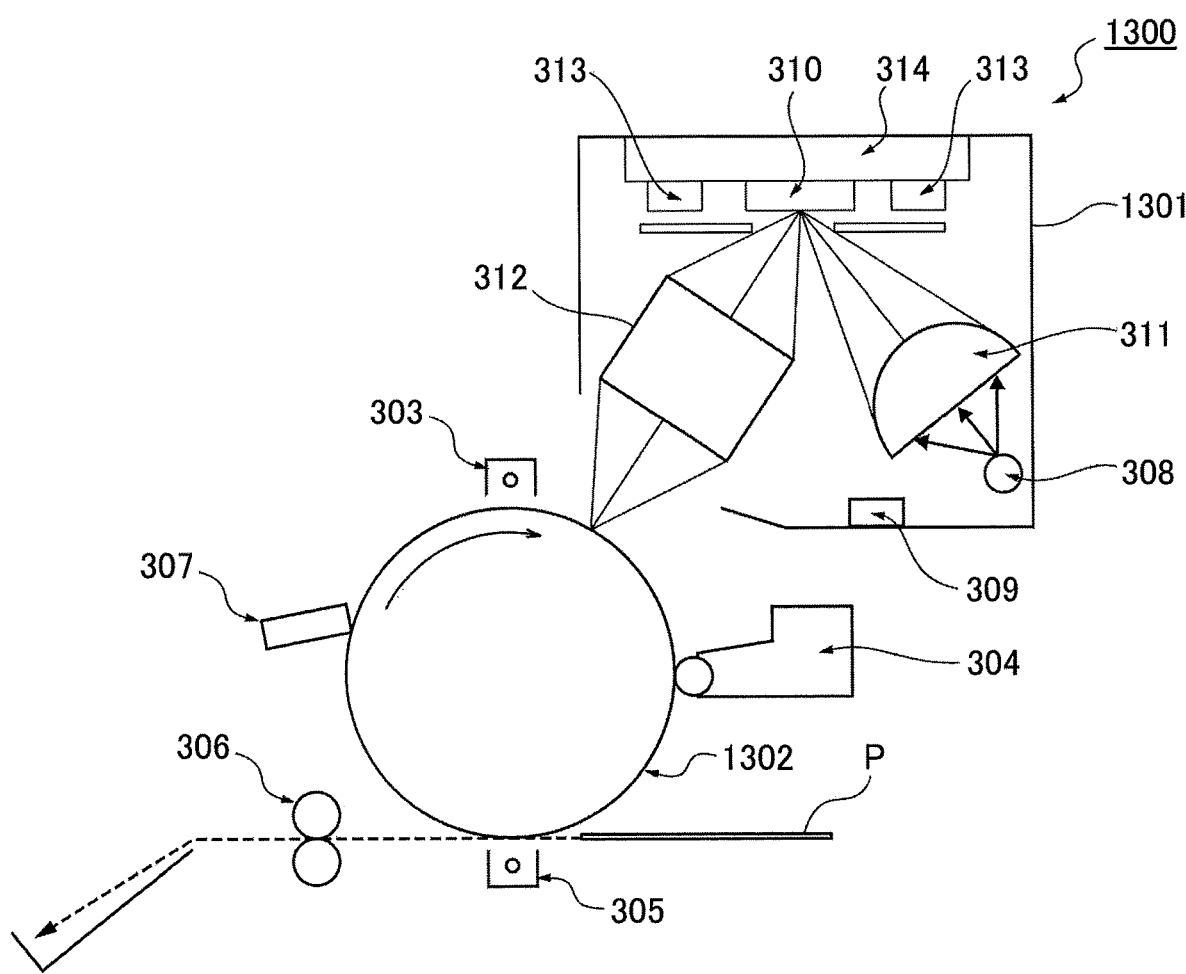
FIG. 13 is a diagram for explaining a schematic configuration of an image forming apparatus according to a fifth embodiment.

Next, a forming apparatus 1300 according to a fifth embodiment will be described. FIG. 13 illustrates an example of the image forming apparatus 1300 in which the optical writing unit of the image forming apparatus 1300 is used.

In the image forming apparatus 1300 illustrated in FIG. 13, an optical writing unit 1301 emits a laser beam to a scan surface so as to write an image thereon. A photoconductor drum 1302 is an image bearer that serves as a surface onto which the optical writing unit 1301 performs scanning. The optical writing unit 1301 scans a single laser beam or a plurality of laser beams modulated by a recording signal onto the surface (the scan surface) of the photoconductor drum 1302 in the axial direction of the photoconductor drum 1302. The photoconductor drum 1302 is driven to rotate in the direction indicated by the arrow, and the surface that is charged by a charger 303 is subjected to optical scanning by the optical writing unit 1301. Accordingly, an electrostatic latent image is formed. The electrostatic latent image is rendered visible by a developing unit 304 as a toner image, and the developed toner image is transferred onto recording paper P at a transfer unit 305. The transferred toner image is fixed onto the recording paper P by a fixing unit 306. The residual toner on the surface of the photoconductor drum 1302 that has passed through the transfer unit 305 is removed by a cleaning unit 307. A belt-type photoconductor may be used in place of the photoconductor drum 1302. Further, a configuration may be adopted in which a toner image is temporarily transferred to a transfer medium other than recording paper, and the toner image is transferred from the transfer medium to recording paper and is fixed.

The optical writing unit 1301 includes, for example, a light source 308 that emits a single laser beam or a plurality of laser beams modulated by a recording signal, a light source driver 309 that modulates the light source 308, an optical deflector 310 equivalent to the optical deflector 1022 of the above-described embodiment, an imaging optical system 311 that forms an image of the laser beam(s) modulated by the recording signal and emitted from the light source 308 on a mirror surface of a mirror substrate of the optical deflector 310, and a scanning optical system 312 that forms, on the surface (the scan surface) of the photoconductor drum (photoconductor) 1302, an image of a reflected single laser beam or a plurality of laser beams reflected from the mirror surface. The optical deflector 310 is mounted on a circuit board 314 together with an integrated circuit 313 that drives the optical deflector 310, and is integrated into the optical writing unit 1301.

The integrated circuit 313 includes the optical scanning drive control unit 16 illustrated in FIG. 2 and the memory 17. The optical deflector 310 is driven and controlled in a similar way to the first embodiment.

The optical deflector according to the present embodiment requires less power to operate as compared to a rotating polygon mirror, and is thus advantageous in reducing power consumption of the image forming apparatus. The optical deflector is of a smaller wind noise when the mirror substrate oscillates than a noise of a rotating polygon mirror, and is thus advantageous in reducing a noise of the image forming apparatus. The optical deflection apparatus requires a considerably smaller installation space than the rotating polygon mirror, and further, the amount of heat generated by the optical deflector is also small, allowing the image forming apparatus to be easily downsized. Namely, the optical deflection apparatus is advantageous in downsizing the image forming apparatus. A conveyance mechanism of the recording paper, a driving mechanism of the photoconductor drum, a controller of the developing unit and the transfer unit, and a drive system of the light source unit are similar to those of a conventional image forming apparatus, and are not illustrated in FIG. 13.

According to the fifth embodiment, because the optical deflector 310 is driven and controlled in a similar manner to the first embodiment, a similar effect to the first embodiment can be obtained.

Sixth Embodiment

Figure 14:
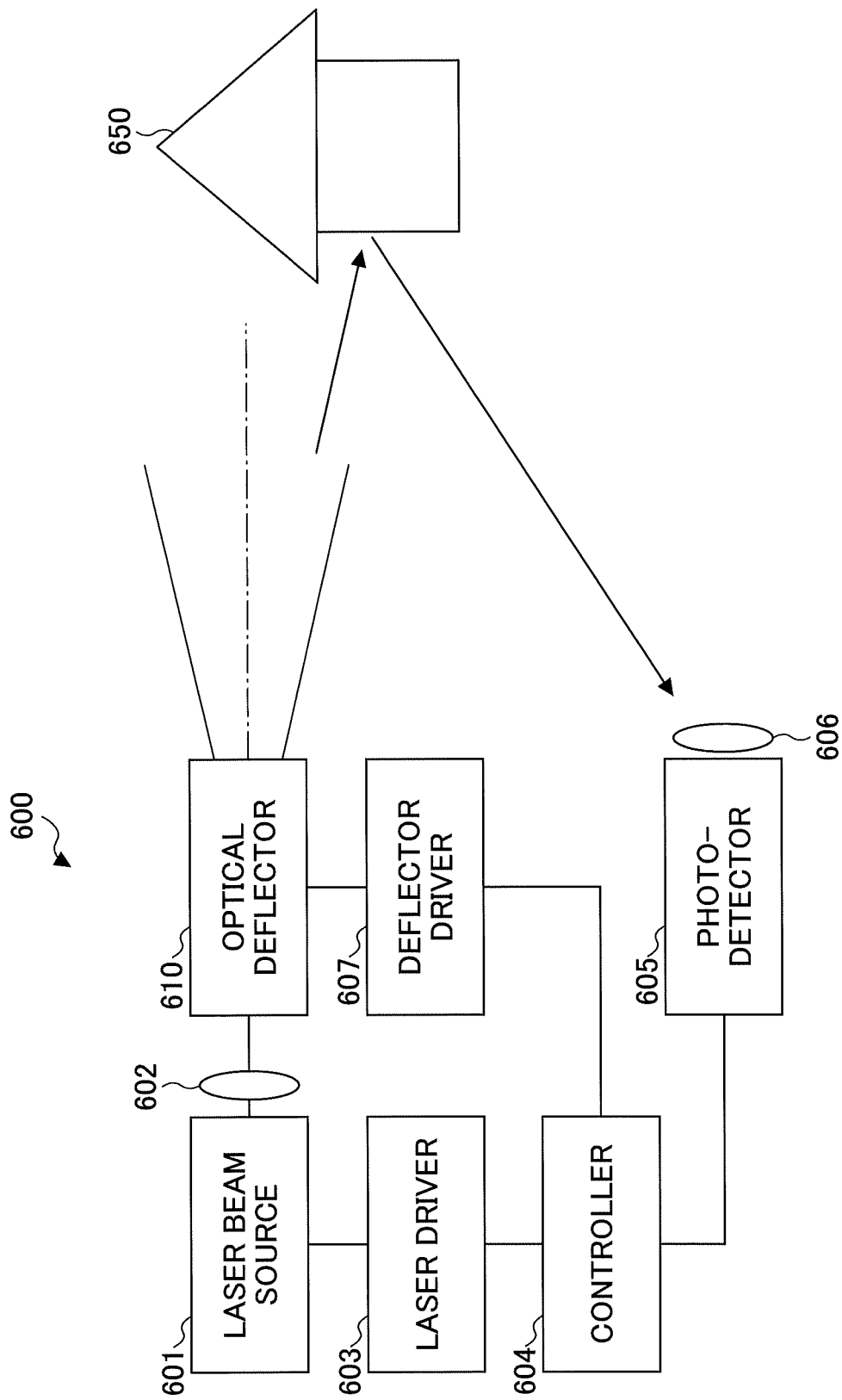
FIG. 14 is a block diagram illustrating a configuration of an object recognition apparatus according to a sixth embodiment.

Next, an object recognition apparatus 600 according to a sixth embodiment will be described. FIG. 14 illustrates the object recognition apparatus 600 according to the sixth embodiment.

The object recognition apparatus 600 uses the optical deflector to optically scan a laser beam (measurement luminous flux) in a target direction, and receives light reflected from a target object existing in the target direction so as to identify the target object. FIG. 14 is a schematic view schematically illustrating a configuration of laser radar serving as an example of the object recognition apparatus 600 according to the sixth embodiment.

As illustrated in FIG. 14, a laser beam emitted from a laser beam source 601 passes through a collimator lens 602, which is an optical system for approximately collimating diverging light, and is uniaxially or biaxially scanned by an optical deflector 610. Accordingly, a target object 650 ahead of vehicle is irradiated with the laser beam. Namely, the optical deflector 610 irradiates the target object 650 with the laser beam (measurement luminous flux). A photodetector 605 receives the laser beam that has been reflected by the target object 650 and that has passed through a condenser lens 606, and outputs a detection signal. A laser driver 603 that serves as a light source drive unit drives the laser beam source 601. A deflector driver 607 that serves as an optical deflector drive unit drives the optical deflector 610.

A controller 604 controls the laser driver 603 and the deflector driver 607, and processes the detection signal output from the photodetector 605. Namely, the controller 604 calculates a distance from the target object 650 based on a time lag between a timing at which the laser beam is emitted and a timing at which the laser beam is received by the photodetector 605. By causing the optical deflector 610 to scan (deflect) the laser beam, the distance from the object 650 in a one-dimensional range or two-dimensional range can be obtained. As described above, a radar apparatus using the optical deflector that is not susceptible to damage can be provided. The object recognition device 600 as described above may be installed, for example, at a front side of a vehicle, and is used to monitor an area ahead of the vehicle and identify whether or not an obstacle is present ahead of the vehicle.

Further, the controller 604 and the deflector driver 607 form the optical deflection apparatus 120 according to the first embodiment together with the optical deflector 610, and the optical deflector 610 is driven and controlled by the controller 604 in a similar manner to the first embodiment. Although not illustrated, a memory (storage) is included in the controller 604. The memory stores information similar to the information (such as the frequency characteristic gradient coefficients and the resonance frequency temperature characteristic coefficients) stored in the memory 17 (see FIG. 2) of the first embodiment.

According to the sixth embodiment, because the optical deflector 610 is driven and controlled in a similar manner to the first embodiment, a similar effect to the first embodiment can be obtained.

In the above-described sixth embodiment, the laser radar has been described as an example of the object recognition apparatus. However, the present invention is not limited the above-described embodiment. The object recognition apparatus may be satisfactory as long as the apparatus identifies an object by performing optical scanning with the optical deflector of the first embodiment and receiving reflected light. For example, the object recognition apparatus may be applied to, for example, biometric authentication that identifies a target object by recording and referring to data obtained by optically scanning a hand or a face, a security sensor that identifies an incoming object by optically scanning the object in a target direction, and a component of a three-dimensional scanner that outputs three-dimensional data by identifying the shape of an object based on distance information obtained by optical scanning. Alternatively, the presence or absence of an object or the shape of an object may be identified from, for example, changes in wavelength and the light intensity of reflected light received by a photoreceptor.

The second to sixth embodiments in which the optical deflector of the first embodiment is used to perform optical scanning have been described above. However, the optical deflector of the first embodiment may be applied to any apparatus as long as the apparatus deflects light and performs one-dimensional or two-dimensional optical scanning.

The present invention is not limited to the above-described embodiments, and design modifications and additions may be acceptable without departing from the scope of the present invention.

For example, in the above-described embodiments, a deflection angle of the mirror unit 6 is calculated based on amounts of elastic deformation of the elastic units 9 and 10 detected by the detecting piezoelectric elements 9F1 and 10F1. However, a detector (for example, a photodiode) disposed on a reflection side may detect light reflected from the mirror unit 6 so as to calculate a deflection angle of the mirror unit 6. Also, resonance frequency characteristics are calculated by detecting a deflection angle of the mirror unit 6 while changing a drive frequency value of the optical deflector at regular intervals. A rate at which the deflection angle of the resonance frequency characteristics becomes the maximum is referred to as a resonance frequency (resonance point).

Further, in the above-described embodiments, the measuring resistor 2R measures a temperature of the optical deflector. However, a temperature sensor disposed outside the optical deflector (for example, a temperature sensor disposed in the image projecting apparatus) may be used to measure a temperature of the optical deflector.

Moreover, in the above-described embodiments, the mirror unit 6 is supported at eccentric positions by the torsion bars 7 and 8, such that a curve indicating resonance frequency characteristics becomes asymmetric with respect to the resonance point. However, the present invention is not limited to the above-described embodiments. As long as a curve indicating resonance frequency characteristics becomes asymmetric, any configuration may be adopted. For example, by disposing the rib of the mirror unit 6 at an eccentric position, a curve indicating resonance frequency characteristics may become asymmetric with respect to the resonance point.

Figure 15:
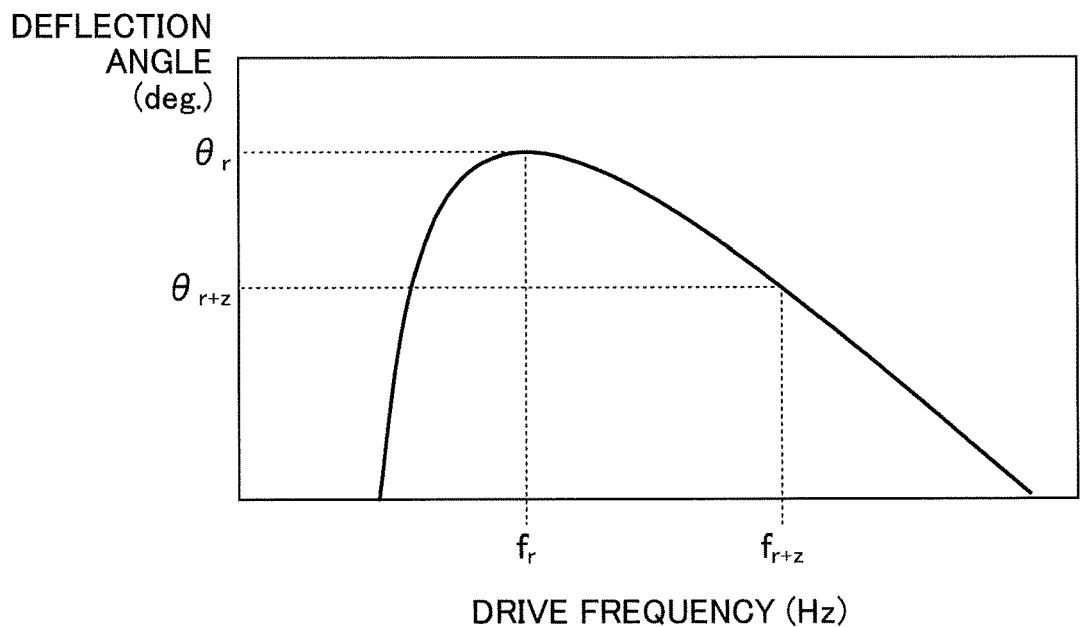
FIG. 15 is a graph illustrating a method of calculating a frequency characteristic gradient coefficient.
Figure 16:
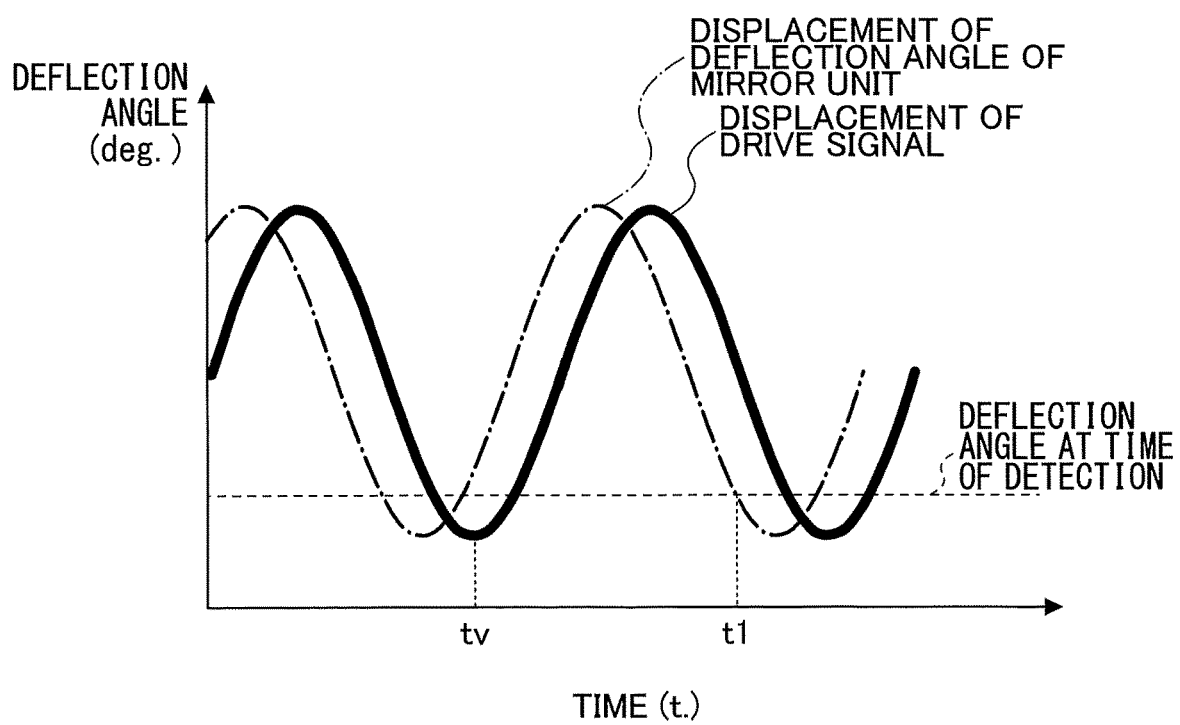
FIG. 16 is a graph illustrating displacement of a drive frequency and displacement of a deflection angle of the mirror unit.

For example, a frequency characteristic gradient coefficient α may be calculated as follows. FIG. 15 is a graph illustrating a method of calculating a frequency characteristic gradient coefficient. As illustrated in FIG. 15, $6r$ denotes a deflection angle of the mirror unit 6 at a resonance frequency $f_r$, and $\theta_{r+z}$ denotes a deflection angle of the mirror unit 6 at a frequency $f_{r+z}$ shifted by z from the resonance frequency. In this case, a frequency characteristic gradient coefficient α is calculated by the following formula.
Frequency characteristic gradient coefficient $\alpha=(\theta_{r+z}-\theta_r)/(f_{r+z}-f_r)$ Further, a drive frequency is preferably controlled by the optical scanning drive control unit 16 as follows. FIG. 16 is a graph illustrating displacement of an input drive signal (a drive frequency) and displacement of a deflection angle of the mirror unit 6. As illustrated in FIG. 16, there is a difference between the displacement of the input drive signal (drive frequency) and displacement of the deflection angle of the mirror unit 6. This displacement difference is a difference caused by response characteristics to a voltage applied to the driving piezoelectric elements.

In FIG. 16, tv denotes a timing at which the drive signal becomes the minimum, t1 denotes a timing at which displacement of the mirror unit is detected after tv, and T denotes a period of the drive signal. In this case, a displacement difference X is calculated by: X=(tv−t1)/T. In FIG. 16, t1, which denotes the timing at which displacement of the mirror unit is detected, also refers to a timing at which light reflected by the mirror unit 6 is detected by a detector (for example, a photodiode).

A difference between a drive frequency and a resonance frequency may be set (adjusted) such that a displacement difference X becomes 10 milliseconds. Accordingly, the displacement difference X becomes always constant, allowing synchronization between a deflection angle of the mirror unit 6 and a light source to become accurate and light from the light source to be reflected to a proper position.

In the above-described embodiments, when a resonance frequency changes due to a change in ambient temperature, a drive frequency is changed according to the change in the resonance frequency. Further, it is preferable to change the drive frequency in different ways according to the ambient temperature and/or the operating time (for example, the time elapsed after the startup of the optical deflection apparatus).

For example, in an image projecting apparatus as a typical example of the head-up display apparatus, when a drive frequency is changed frequently at a short interval or is changed significantly, discrete amplitude changes occur. As a result, a projected image size changes frequently at a short interval or changes significantly. Such a change in the image size could result in disturbance in image projection.

In light of the above, only when the rate of change in ambient temperature exceeds a first threshold, a drive frequency is changed. Accordingly, it is possible to prevent the amplitude from changing frequently at a short interval, and thus prevent the image size from changing frequently. Accordingly, disturbance in image projection can be suppressed. Further, even when the rate of change in ambient temperature does not exceed the first threshold, a drive frequency may be changed in a predetermined period or at a predetermined timing. For example, when the number of cyclic repetitions of the drive frequency exceeds m times, the drive frequency may be corrected according to the ambient temperature. Accordingly, even when the ambient temperature gradually changes, the displacement difference X can be maintained.

Furthermore, the ambient temperature significantly changes mainly at startup of the optical deflector (for a period of several seconds to several minutes after a voltage begins to be applied to the optical deflector). Therefore, in an early stage after the startup, the drive frequency may be corrected k times per minute (n>k). Accordingly, even in the early stage after the startup during which the ambient temperature changes significantly, a phase difference X can be accurately maintained while preventing the amplitude from changing frequently at a short interval and thus preventing the image size from changing in the early stage after the startup.

Further, the rate at which a drive frequency is corrected (for example, the number of times the drive frequency is changed per unit time) preferably differs between when a phase difference X or a difference between a resonance frequency and the drive frequency becoming smaller than a set value versus becoming larger than the set value. For the resonance frequency characteristics as illustrated in FIG. 7, when the drive frequency becomes smaller than the set value, the drive frequency becomes closer to the resonance frequency and sometimes becomes even smaller than the resonance frequency. In this case, the drive frequency shifts from a gentle slope side to a steep slope side of the resonance frequency characteristic curve. Therefore, response sensitivity (for example, a deflection angle when a drive voltage is applied with a predetermined drive frequency) changes rapidly, causing the amplitude to change rapidly.

In light of the above, when a phase difference X or a difference between a resonance frequency and a drive frequency becomes smaller than a set value, the rate at which the drive frequency is corrected is set higher than that under normal conditions. Accordingly, a rapid change in amplitude can be suppressed.

Further, the speed at which a drive frequency is changed and/or the rate at which the drive frequency is corrected may be changed according to ambient temperature. For example, the optical deflector becomes warm gradually after the startup. Thus, the temperature of the optical deflector tends to change in the early stage after the startup. As the temperature decreases, the resonance frequency gradually shifts to the high-frequency side as illustrated in FIG. 4. In a case where the drive frequency is fixed, the drive frequency becomes closer to the resonance frequency and even becomes smaller than the resonance frequency, causing the drive frequency to shift from the gentle slope side to the steep slope side of the resonance frequency characteristic curve. As a result, response sensitivity (for example, a deflection angle when a drive voltage is applied at a predetermined drive frequency) changes rapidly, causing the amplitude to change rapidly.

Figure 17:
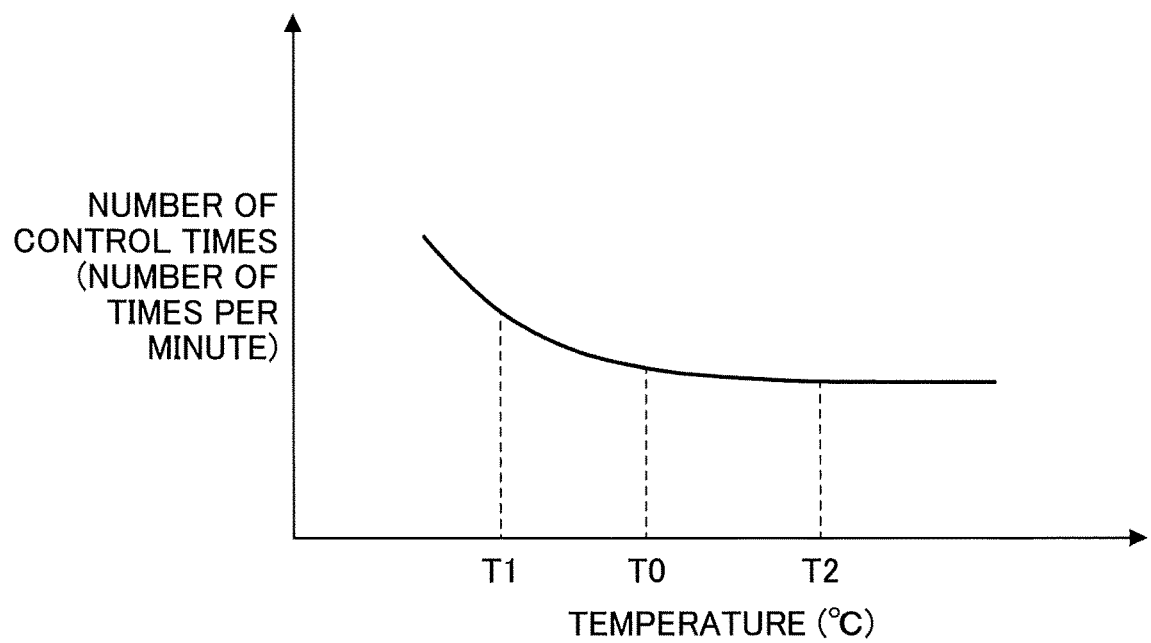
FIG. 17 is a graph illustrating a relationship between a temperature and the number of times a drive frequency is changed per unit time.

Therefore, as illustrated in FIG. 17, the rate at which a drive frequency is corrected is set higher on a lower temperature side than a reference temperature T0 (for example, 20° C.). Accordingly, the phase difference X or the difference between the resonance frequency and the drive frequency can be accurately maintained even when the resonance frequency significantly changes at a temperature lower than the reference temperature T0. FIG. 17 is a graph illustrating a relationship between a temperature and the number of times a drive frequency is changed per unit time. In other words, a first time interval at which the optical scanning drive control unit 16 changes the drive frequency in a first temperature range may be shorter than a second time interval at which the optical scanning drive control unit 16 changes the drive frequency in a second temperature range that is higher than the first temperature range.

Further, when the phase difference X or the difference between the resonance frequency and the drive frequency is larger than the set value, the drive frequency is corrected to return to the set value. In this case, the correction (change) speed is preferably changed according to the ambient temperature. For example, when a difference from the set value is corrected at a time interval of 10 milliseconds, namely, when the drive frequency is changed at a time interval of 10 milliseconds, an image size changes instantaneously, which causes disturbance in image projection. Therefore, by correcting a difference from the set value at a time interval of one second, such disturbance in image projection can be suppressed.

However, at a low temperature, there may be a case where correction does not keep up with temperature change unless the drive frequency is changed quickly. When correction does not keep up with temperature change, the drive frequency becomes closer to the resonance frequency and even becomes smaller than the resonance frequency, causing the drive frequency to shift from the gentle slope side to the steep slope side of the resonance frequency characteristic curve. As a result, response sensitivity (for example, a deflection angle when a drive voltage is applied at a predetermined drive frequency) changes rapidly, causing the amplitude to change rapidly.

Figure 18:
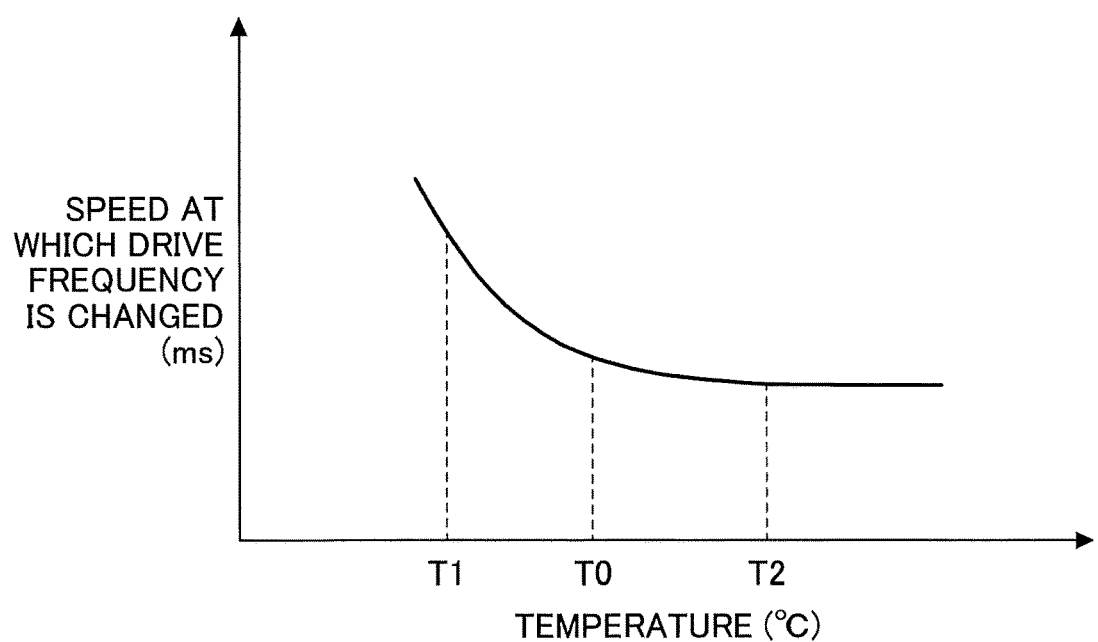
FIG. 18 is a graph illustrating a relationship between a temperature and a speed at which a drive frequency is changed.

Therefore, as illustrated in FIG. 18, the speed at which the drive frequency is corrected is preferably set faster on a lower temperature side than a reference temperature T0 (for example, 20° C.) In other words, a first speed at which the optical scanning drive control unit 16 changes the drive frequency in a third temperature range may be faster than a second speed at which the optical scanning drive control unit 16 changes the drive frequency in a fourth temperature range that is higher than the third temperature range. The third temperature range may be the same as or may be different from the above-described first temperature range. Similarly, the fourth temperature range may be the same as or may be different from the above-described second temperature range. FIG. 18 is a graph illustrating a relationship between a temperature and a speed at which a drive frequency is changed. As described above, it is possible to avoid a case where correction does not keep up with temperature change at a low temperature. Further, it is also possible to suppress disturbance in image projection when a drive frequency is rapidly changed at a reference temperature or in a range of higher temperature than the reference temperature.

According to an aspect of at least one embodiment, change in a deflection angle of a mirror unit due to a change in ambient temperature can be suppressed.

Although the present invention has been described based on the embodiments, the present invention is not limited to the above-described embodiments and various modifications and variations may be made without departing from the scope of the present invention.

What is claimed is:

1. An optical deflection apparatus comprising:
   a mirror unit;
   a pair of elastic supporting units configured to rotatably support the mirror unit around a predetermined axis;
   at least one drive unit configured to elastically deform the pair of elastic supporting units; and
   a drive control unit configured to input a drive frequency into the at least one drive unit so as to control the at least one drive unit, wherein
      a first time interval at which the drive control unit changes the drive frequency in a first temperature range is shorter than a second time interval at which the drive control unit changes the drive frequency in a second temperature range, the second temperature range being at a higher temperature than the first temperature range, and
      a first speed at which the drive control unit changes the drive frequency in a third temperature range is faster than a second speed at which the drive control unit changes the drive frequency in a fourth temperature range, the fourth temperature being at a higher temperature than the third temperature range.

2. An optical deflection apparatus comprising:
   a mirror unit;
   a pair of elastic supporting units configured to rotatably support the mirror unit around a predetermined axis;
   at least one drive unit configured to elastically deform the pair of elastic supporting units; and
   a drive control unit configured to input a drive frequency into the at least one drive unit so as to control the at least one drive unit, wherein
      a first time interval at which the drive control unit changes the drive frequency in a first temperature range is shorter than a second time interval at which the drive control unit changes the drive frequency in a second temperature range, the second temperature range being at a higher temperature than the first temperature range,
      the at least one drive unit is configured to resonate the mirror unit by using elastic deformation of the pair of elastic supporting units so as to rotate the mirror unit around the predetermined axis and deflect luminous flux incident on the mirror unit, and
      the pair of elastic supporting units are configured to support the mirror unit such that, in a resonance characteristic curve indicating resonance characteristics of the optical deflection apparatus, a slope on one side of a resonance frequency becomes smaller than a slope on another side of the resonance frequency, the one side being one of a higher frequency side or a lower frequency side relative to the resonance frequency.

3. The optical deflection apparatus according to claim 2, wherein the drive frequency is a frequency on the one side.

4. The optical deflection apparatus according to claim 3, comprising an error correcting unit configured to correct deflection angle error around an axis of the mirror unit, based on a frequency characteristic gradient coefficient indicating the slope on the one side of the resonance characteristic curve and also based on an actual deflection angle and a desired deflection angle around the axis of the mirror unit.

5. The optical deflection apparatus according to claim 3, wherein the drive frequency is set in a range greater than the resonance frequency and less than or equal to a sum of the resonance frequency +20 Hz.

6. The optical deflection apparatus according to claim 3, comprising a temperature detecting unit configured to detect an ambient temperature,
   wherein the drive control unit is configured to set the drive frequency based on the resonance characteristics of the optical deflection apparatus and a detection result by the temperature detecting unit.

7. The optical deflection apparatus according to claim 3, comprising:
   a memory configured to store rotation angles of the mirror unit corresponding to respective drive frequencies; and
   at least one angle detecting unit configured to detect a rotation angle of the mirror unit rotated by the at least one drive unit,
   wherein the at least one drive unit is configured to determine, by referring to the memory, the drive frequency based on the rotation angle detected by the at least one angle detecting unit.

8. The optical deflection apparatus according to claim 7, wherein the rotation angles of the mirror unit corresponding to the respective drive frequencies are stored in the memory before the at least one angle detecting unit detects the rotation angle of the mirror unit.

9. A head-up display apparatus comprising the optical deflection apparatus according to claim 2.

10. An optical writing unit comprising:
    the optical deflection apparatus according to claim 2; and
    an imaging optical system configured to form, in a spot shape on a scan surface, an image of reflected light deflected by the optical deflection apparatus.

11. An image forming apparatus comprising:
the optical writing unit according to claim 10;
a photoconductor disposed on the scan surface of the optical writing unit to form a latent image upon the reflected light being scanned;
a developing unit configured to develop the latent image by using a toner; and
a transfer unit configured to transfer a developed toner image onto recording paper.

12. An object recognition apparatus comprising:
the optical deflection apparatus according to claim 2 configured to irradiate a target object with measurement luminous flux; and
a photodetector configured to receive reflected light from the target object,
wherein the target object is identified based on the reflected light received by the photodetector.

* * * * *